United States Patent
Prokudin et al.

(10) Patent No.: US 9,838,420 B2
(45) Date of Patent: *Dec. 5, 2017

(54) SYSTEM AND METHOD FOR DISTRIBUTING MOST EFFECTIVE ANTIVIRUS RECORDS TO USER DEVICES

(71) Applicant: AO Kaspersky Lab, Moscow (RU)

(72) Inventors: Sergey V. Prokudin, Moscow (RU); Alexey M. Romanenko, Moscow (RU)

(73) Assignee: AO Kaspersky Lab, Moscow (RU)

(*) Notice: Subject to any disclaimer, the term of this patent is extended or adjusted under 35 U.S.C. 154(b) by 0 days.

This patent is subject to a terminal disclaimer.

(21) Appl. No.: 15/403,542

(22) Filed: Jan. 11, 2017

(65) Prior Publication Data

US 2017/0126707 A1    May 4, 2017

Related U.S. Application Data

(63) Continuation of application No. 15/099,195, filed on Apr. 14, 2016, now Pat. No. 9,578,065.

(30) Foreign Application Priority Data

Sep. 30, 2015   (RU) ............................... 2015141539

(51) Int. Cl.
*H04L 29/00*  (2006.01)
*H04L 29/06*  (2006.01)
*G06F 21/56*  (2013.01)

(52) U.S. Cl.
CPC ............ *H04L 63/145* (2013.01); *G06F 21/56* (2013.01); *G06F 21/561* (2013.01);
(Continued)

(58) Field of Classification Search
None
See application file for complete search history.

(56) References Cited

U.S. PATENT DOCUMENTS 8,776,234 B2   7/2014   Doukhvalov
8,875,292 B1   10/2014  Bogorad et al.
(Continued)

FOREIGN PATENT DOCUMENTS

RU   2449360 C1   4/2012

OTHER PUBLICATIONS

Sukwong, Orathai, Hyong Kim, and James Hoe. "Commercial antivirus software effectiveness: an empirical study." Computer 44.3 (2011): 63-70.*

*Primary Examiner* — Madhuri Herzog
(74) *Attorney, Agent, or Firm* — Arent Fox LLP; Michael Fainberg (57) ABSTRACT

Disclosed are system and method for distributing most effective antivirus records to user devices. An exemplary method includes: collecting, by a server, statistics on the use of a plurality of antivirus records deployed on a plurality of user devices; calculating, by the server, a coefficient of effectiveness of each antivirus record based on the collected statistics on the use of the plurality of antivirus records by the plurality of user devices; identifying, by the server, a group of the plurality of antivirus records having the largest coefficients of effectiveness, wherein the group is a number of the plurality of antivirus records not exceeding a threshold value; and transmitting, by the server, the group of antivirus records to at least one of the plurality of user devices for storage in an antivirus database for use by an antivirus application of the at least one user device.

21 Claims, 3 Drawing Sheets

(52) U.S. Cl.
CPC ........ G06F 21/564 (2013.01); H04L 63/1416 (2013.01); H04L 63/1441 (2013.01)

(56) References Cited

U.S. PATENT DOCUMENTS

| | | | |
|---|---|---|---|
| 8,990,948 B2 | 3/2015 | Yarykin | |
| 9,171,156 B1 | 10/2015 | Bogorad | |
| 2003/0110393 A1 | 6/2003 | Brock et al. | |
| 2012/0174227 A1 | 7/2012 | Mashevsky | |
| 2012/0192273 A1 | 7/2012 | Turbin | |
| 2012/0324579 A1 | 12/2012 | Jarrett et al. | |
| 2014/0137249 A1 | 5/2014 | Johnson et al. | |
| 2014/0143869 A1* | 5/2014 | Pereira | G06F 21/566 726/23 |
| 2016/0156656 A1* | 6/2016 | Boggs | H04L 63/1433 726/25 |

* cited by examiner

SYSTEM AND METHOD FOR DISTRIBUTING MOST EFFECTIVE ANTIVIRUS RECORDS TO USER DEVICES

CROSS-REFERENCE TO RELATED APPLICATIONS

The present application is a continuation of U.S. patent application Ser. No. 15/099,195 filed on Apr. 14, 2016, which claims benefit of priority under 35 U.S.C. 119(a)-(d) to a Russian Application No. 2015141539 filed Sep. 30, 2015, both of which are incorporated by reference herein.

FIELD OF TECHNOLOGY

The present invention relates generally to the field of computer security and, more specifically to systems and methods for distributing antivirus records to user devices.

BACKGROUND

Among the multitude of applications there is a group of malicious programs which are able to cause harm to the user device or the data of the user, such as: Internet worms, key loggers and computer viruses. There have been developed many different technologies for providing computer security, such as antivirus software, which is designed to detect malicious programs on the user device and to block their operating ability (e.g., placing them in quarantine or removing them from the user device).

The antivirus software may use a number of different methods of detecting malicious software, malicious processes, other malicious objects of the operating system (OS) and links to them, such as the URI (Universal Resource Identifier, such as file://***.exe). The most popular malware detection methods are signature analysis (a technology for finding correspondences between a particular segment of code of the program being analyzed and a known code, or signature, in a database of signatures of malicious programs), heuristic analysis (a technology involving emulating the working of a program being analyzed, creating an API (Application Programming Interface) function call log, and finding correspondences between the data of the created API function call log and the data in a database of emulations of malicious programs), and proactive analysis (a technology involving intercepting API function calls launched in the system of the program being analyzed, creating an API function call log, and finding correspondences between the data of the created log and the data in a database of calls for API functions of malicious programs).

In operation, each of the aforementioned methods requires data to be used for the detection of malicious objects, for example, in the case of signature analysis, such data might be signatures, for heuristic analysis, such the data might be heuristic rules. Despite the fact that, for example, when a single signature is used, the antivirus software may detect a whole array of malicious objects similar in their structure or in the harm caused. Therefore, the ever increasing number of malicious objects which can cause harm to the user's data or to his computer requires a corresponding increase in the volume of data used for detecting malicious objects. In the majority of cases, said data is stored on the user's computer as part of antivirus libraries—a component of the antivirus software. Thus, increasing the volume of data used for the detection, may result in the decrease of available space on the hard drive of the user device.

Although there are known approaches aimed at optimizing (reducing) the space on a hard drive occupied by data used for the detection of malicious objects, they are not able to solve the problem of distributing the data used for detecting malicious objects between a remote server and a local hard drive or they do not solve it effectively enough. Therefore, there is a need for a more effective solution of the problem of distributing to user devices the data used for detecting malicious objects.

SUMMARY

Disclosed are system and method for distributing most effective antivirus records to user devices. An exemplary method includes collecting, by a server, statistics on the use of a plurality of antivirus records deployed on a plurality of user devices; calculating, by the server, a coefficient of effectiveness of each antivirus record based on the collected statistics on the use of the plurality of antivirus records by the plurality of user devices; identifying, by the server, a group of the plurality of antivirus records having the largest coefficients of effectiveness, wherein the group is a number of the plurality of antivirus records not exceeding a threshold value; and transmitting, by the server, the group of antivirus records to at least one of the plurality of user devices for storage in an antivirus database for use by an antivirus application of the at least one user device.

In one exemplary aspect, the method further comprises: receiving, from the at least one user device, one or more less effective antivirus records removed from the antivirus database of the user device; and storing the one or more received less effective antivirus records in an antivirus database of the server if said antivirus records were not in the antivirus database of the server.

In one exemplary aspect, an antivirus record of the plurality of antivirus records includes one or more of: a signature of a malicious file; a heuristic rule used for detection of a malicious file during emulation of the malicious file; a heuristic rule used for detection of a malicious file during proactive detection; and a locality sensitive hash of a malicious file.

In one exemplary aspect, collecting statistics on the use of a plurality of antivirus records includes collecting information on a detection of a malicious file by the respective antivirus record.

In one exemplary aspect, the method further comprises: calculating the coefficient of effectiveness of an antivirus record as a function of a number of unique user devices on which malicious files were detected using said antivirus record and a time between a moment of creation of said antivirus record and a moment of calculation of the coefficient of effectiveness of said antivirus record.

In one exemplary aspect, the method further comprises: calculating the coefficient of effectiveness of the antivirus record further as a function of a number of different malicious files detected using the antivirus record and an average time between detections of malicious files using said antivirus record.

In one exemplary aspect, transmitting the group of effective antivirus records to the least one user device includes transmitting the antivirus records in the group to the at least one user devices only when the effectiveness coefficient of each of the antivirus record exceeds the effectiveness coefficient of at least one less effective antivirus record on the at least one user device.

In another exemplary aspect, a system for distributing antivirus records to a user device, the system comprises: a server having a processor configured to collect statistics on the use of a plurality of antivirus records deployed on a plurality of user devices; calculate a coefficient of effectiveness of each antivirus record based on the collected statistics on the use of the plurality of antivirus records; identify a group of the plurality of antivirus records having the largest coefficients of effectiveness, wherein the group is a number of the plurality of antivirus records not exceeding a threshold value; and transmit the group of antivirus records to at least one of the plurality of user devices for storage in an antivirus database for use by an antivirus application of the at least one user device.

Yet in another exemplary aspect, a non-transitory computer readable medium storing computer executable instructions for distributing antivirus records to a user device, includes instructions for: collecting, by a server, statistics on the use of a plurality of antivirus records deployed on a plurality of user devices; calculating, by the server, a coefficient of effectiveness of each antivirus record based on the collected statistics on the use of the plurality of antivirus records by the plurality of user devices; identifying, by the server, a group of the plurality of antivirus records having the largest coefficients of effectiveness, wherein the group is a number of the plurality of antivirus records not exceeding a threshold value; and transmitting, by the server, the group of antivirus records to at least one of the plurality of user devices for storage in an antivirus database for use by an antivirus application of the at least one user device.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION OF EXEMPLARY ASPECTS

Example aspects of the present invention are described herein in the context of a system, method, and computer program product for distribution of most effective antivirus records to user devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Initially, a number of definitions of terms which will be used in describing various exemplary aspects of the invention will be provided herein below.

The statistics of use of an antivirus record may include information about the number of malicious files detected by an antivirus application using antivirus record, the number of users on whose computers said malicious files were detected, the location of each detected malicious file (for example, location on the drive, and also the IP address of the computer on which the file resides), the time of each detection, and also the time of creation of the antivirus record used for the detection of malicious files.

The coefficient of effectiveness of an antivirus record is a numerical value; the larger it is, the more malicious files have been detected by the antivirus application using a particular antivirus record. It is presumed that the larger the coefficient of effectiveness of an antivirus record, the more important it is for this antivirus record to be used by the antivirus application and to be present on the user's computer, and not on a remote server, since antivirus records on a remote server might not be accessible to the antivirus application, for example, due to connection problems between the computer and the remote server.

Figure 1:
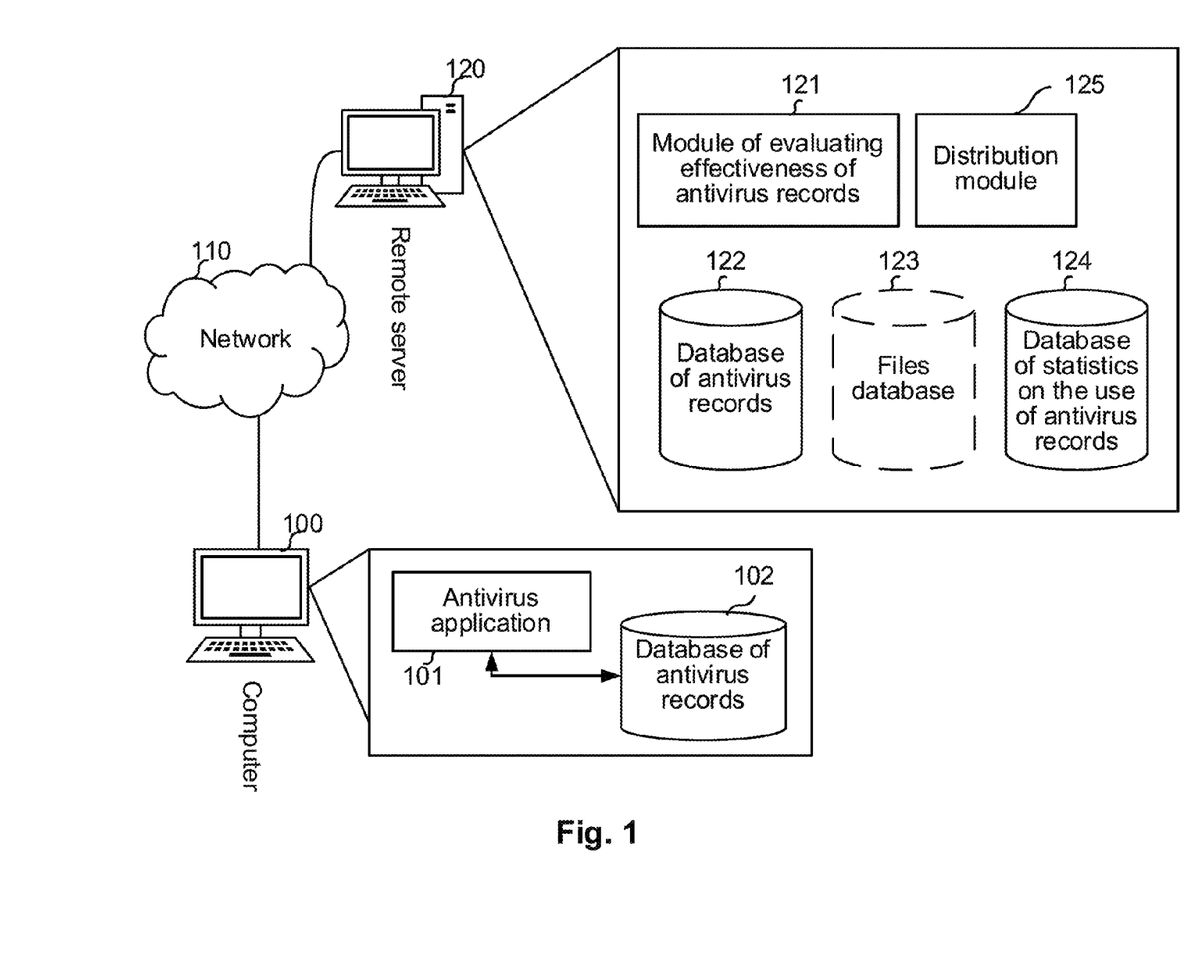
FIG. 1 illustrates a diagram of an exemplary system for distribution of antivirus records to user devices.

FIG. 1 shows diagram of an exemplary system for distribution of antivirus records to user devices. The user's computer (hereinafter, for simplicity, the computer 100), a detailed diagram of which is presented in FIG. 3, has an antivirus application 101 installed thereon for detection of malicious files on the computer. For the detection of malicious files, the antivirus application 101 uses antivirus records, which may be stored either at the user's side, on the user's computer 100, or on a remote server 120. For the storage of the antivirus records on the computer 100 a database of antivirus records 102 may be used (which can be a component of the antivirus application 101). For the storage of the antivirus records on the remote server 120, a database of antivirus records 122 may be used. In one exemplary aspect, the computer 100 and the remote server 120 are connected via a network 110, for example, via the Internet or a local area computer network. In one exemplary aspect, among the antivirus records which are used by the antivirus application 102 there may be antivirus records for which detection of malicious files is not accompanied by a message sent to the user of the computer 100, similar to the approach described in a commonly owned U.S. Pat. No. 8,732,836, which is incorporate by reference herein.

The antivirus application 101 is also configured to collect statistics on the use of antivirus records, which are used for the detection of malicious files. In one exemplary aspect, these statistics may be collected upon detection of a malicious file with the use of the antivirus record on the user's computer 100. In yet another exemplary aspect, another antivirus application (not shown in FIG. 1) may also reside on the remote server 120. This application also collects statistics on the use of antivirus records using a files database 123, specifically, upon detection of malicious files with the use of the antivirus records among the files of the files database 123. In one exemplary aspect, the statistics collected by the antivirus application 101 are sent to the remote server 120 for storage in a database of statistics on the use of antivirus records 124.

It should be noted that the statistics on use of an antivirus record may be collected by a plurality of antivirus applications 101 installed on a plurality of computers 100 (including the antivirus application 101 running on the remote server 120). In such a case, each antivirus application 101 sends statistics on the use of the antivirus record to the remote server 120, specifically, to the database of statistics on the use of antivirus records 124, which stores the totality of information on the use of the antivirus record by each of the antivirus applications.

In one exemplary aspect, new antivirus records which are created, for example, by a computer security expert or by any of the known automated methods of creation of antivirus records, are transferred by a distribution module 125 to a database of antivirus records 102 for use by the antivirus application 101. In yet another exemplary aspect, new antivirus records which are created, for example, by a computer security expert or by any of the known automated methods of creation of antivirus records, are transferred by the distribution module 125 to the database of antivirus records 122 for use by the antivirus application 101.

A module for evaluating effectiveness of antivirus records 121, residing on the remote server 120, is configured to calculate the coefficient of effectiveness of an antivirus record using the statistics on the use of the antivirus record that are stored in the database of statistics on the use of antivirus records 124. In one exemplary aspect, the coefficient of effectiveness of each antivirus record can be calculated using of the following formula:

$$K = \frac{U}{T}.$$

In another one exemplary aspect, the coefficient of effectiveness of an antivirus record may be calculated using another formula:

$$K = \frac{U * S}{T * \Delta T},$$

where K is the coefficient of effectiveness of the antivirus record, U is the number of unique users on whose computers malicious files have been detected by an antivirus application using said antivirus record, S is the number of malicious files detected using said antivirus record, T is the interval of time (counted, e.g., in days and hours) between the time of creation of the antivirus record and the moment of calculation of the coefficient of effectiveness of the antivirus record, $\Delta T$ is the mean interval of time (counted, e.g., in hours) between detections of malicious files by the antivirus application with the use of the antivirus record. In yet another exemplary aspect, in place of $\Delta T$ in the above formula one can uses Tmax—the maximum interval of time (counted, e.g., in hours) between detections of malicious files by the antivirus application with the use of the antivirus record. As is evident from the above, the more time has passed from the moment of creation of the antivirus record until the moment of calculation of the coefficient of effectiveness, the lower the value of the coefficient of effectiveness (K is inversely proportional to T). Furthermore, the time of creation of the antivirus record can be included in the antivirus record (as supplemental information) when it is created (for example, by a computer security expert).

The calculated coefficients of effectiveness are transferred by the module for evaluating effectiveness 121 to the antivirus application 101 on the computer 100, and also to the distribution module 125. In one exemplary aspect, the distribution module 125 can be a component of the aforementioned antivirus application residing on the remote server 120. The distribution module 125 is able to transfer the antivirus records stored in the database of antivirus records 122 residing on the remote server 120 to the antivirus application 101, to the database of antivirus records 102 residing on the computer 100. The antivirus application 101 is also able to transfer the antivirus records stored in the database of antivirus records 102 residing on the computer 100 to the database of antivirus records 122 residing on the remote server 120. In one exemplary aspect, the antivirus application 101 and the distribution module 125 are able to modify the databases of antivirus records 102 and 122 by adding, removing, or replacing the antivirus records from these databases.

The task of distribution of the antivirus records (changing their location between the remote server 120 and the computer 100) consists in assuring a reliable and rapid access of the antivirus application 101 to the effective antivirus records, wherein in the given context, effective antivirus records means antivirus records with the largest values of the coefficients of effectiveness. Therefore, the most effective antivirus records should preferably reside on the computer 100, specifically, in the database of antivirus records 102. At the same time, less effective records should be also accessible to the antivirus application 101, but they may be stored on the remote server 120 in the database 122.

The distribution module 125, by using the obtained coefficients of effectiveness of the antivirus records, checks whether the antivirus records which are stored on the remote server 120, specifically in the database of antivirus records 122, contain antivirus records whose coefficients of effectiveness are among the largest coefficients of effectiveness computed by the module for evaluating effectiveness 121. The largest coefficients of effectiveness are the group of coefficients of effectiveness with the largest values. This group is limited in size by a threshold value—the number of elements in the group cannot exceed the threshold value. In one exemplary aspect, the threshold value can take on the value 100. In one exemplary aspect, if the coefficient of effectiveness of an antivirus record being stored on the remote server 120 in the database of antivirus records 122 is among the number of the largest coefficients of effectiveness of the antivirus records (where this number does not exceed the threshold value, as indicated above), the distribution module 125 transfers this antivirus record to the computer 100, specifically to the database of antivirus records 102, so that the antivirus application 101 makes use of that antivirus record. In one exemplary aspect, the antivirus record transferred to the computer 100 may be removed from the database of antivirus records 122 residing on the remote server 120. In yet another exemplary aspect, the antivirus record transferred to the computer 100 is not removed from the database of antivirus records 122 residing on the remote server 120.

In one exemplary aspect, if the coefficient of effectiveness of an antivirus record which is being stored on the remote server 120 in the database of antivirus records 122 is not among the number of the largest coefficients of effectiveness of the antivirus records (where this number does not exceed the threshold value, as indicated above), the distribution module 125 does not transfer this antivirus record to the computer 100, specifically to the database of antivirus records 102, for the antivirus application 101 to use that antivirus record.

The antivirus application 101 uses the received coefficients of effectiveness of the antivirus records to check whether the antivirus records being stored on the computer 100, specifically in the database of antivirus records 102, contain antivirus records whose coefficients of effectiveness are among the largest coefficients of effectiveness computed by the module for evaluating effectiveness 121. The largest coefficients of effectiveness are the group of coefficients of effectiveness with the largest values. This group is limited in size by a threshold value—the number of elements in the group cannot exceed the threshold value. In one exemplary aspect, the threshold value can take on the value 100. In one exemplary aspect, if the coefficient of effectiveness of an antivirus record being stored on the computer 100 in the database of antivirus records 102 is not among the number of the largest coefficients of effectiveness of the antivirus records (where this number does not exceed the threshold value, as indicated above), the antivirus application 101 transfers this antivirus record to the remote server 120, specifically to the database of antivirus records 122, so that the antivirus application 101 makes use of that antivirus record. In one exemplary aspect, the antivirus record transferred to the remote server 120 is removed from the database of antivirus records 102 residing on the computer 100. In yet another exemplary aspect, the antivirus record transferred to the remote server 120 is not removed from the database of antivirus records 102 residing on the computer 100.

In one exemplary aspect, if the coefficient of effectiveness of an antivirus record which is being stored on the computer 100 in the database of antivirus records 102 is among the number of the largest coefficients of effectiveness of the antivirus records (where this number does not exceed the threshold value, as indicated above), the antivirus application 101 does not transfer this antivirus record to the remote server 120, specifically to the database of antivirus records 122, for the antivirus application 101 to make use of that antivirus record.

It should be noted that both the antivirus application 101 and the distribution means 125 can transfer more than one antivirus record in the aforementioned manner. In one exemplary aspect, the aforementioned threshold values limiting the size of the group of coefficients of effectiveness with the largest values take on the same value.

In one exemplary aspect, the distribution module 125 transfers the antivirus record being stored in the database of antivirus records 122 to the user's computer 100, specifically to the database of antivirus records 102, only when the coefficient of effectiveness of this antivirus record exceeds the coefficient of effectiveness of another antivirus record being stored on the computer 100 (specifically in the database of antivirus records 102) by more than an established percentage (such as 10%) as determined by a computer security expert, for example; the coefficient of effectiveness of said antivirus record being stored on the computer 100 not being among the largest coefficients of effectiveness of the antivirus records. For example, if the database of antivirus records 122 has an antivirus record whose coefficient of effectiveness is 551, while the database of antivirus records 102 has an antivirus record whose coefficient of effectiveness is 500, the distribution module 125 will transfer to the database of antivirus records 102 the antivirus record being stored in the database of antivirus records 122 whose coefficient of effectiveness is 551 (10% of the number 500 is 50, and 551 is larger than 500 by more than 10%). In one exemplary aspect, when comparing two coefficients of effectiveness, the established percentage (which must be exceeded by the coefficient of effectiveness of the antivirus record from the database of antivirus records 122 in order for this antivirus record to be transferred to the database of antivirus records 102) is calculated on the basis of the lesser of the two coefficients of effectiveness being compared.

In one exemplary aspect, the antivirus application 101 transfers the antivirus record being stored in the database of antivirus records 102 to the remote server 120, specifically to the database of antivirus records 122, only when the coefficient of effectiveness of another antivirus record being stored on the remote server 120 (specifically in the database of antivirus records 122) exceeds the coefficient of effectiveness of this antivirus record being stored on the computer 100 by more than an established percentage (such as 10%) as determined by a computer security expert, for example; the coefficient of effectiveness of said antivirus record being stored on the remote server 120 being among the largest coefficients of effectiveness of the antivirus records. For example, if the database of antivirus records 102 has an antivirus record whose coefficient of effectiveness is 500, while the database of antivirus records 122 has an antivirus record whose coefficient of effectiveness is 551, the antivirus application 101 will transfer to the database of antivirus records 122 the antivirus record being stored in the database of antivirus records 102 whose coefficient of effectiveness is 500 (10% of the number 500 is 50, and 551 is larger than 500 by more than 10%). In one exemplary aspect, when comparing two coefficients of effectiveness, the established percentage (which must be exceeded by the coefficient of effectiveness of the antivirus record from the database of antivirus records 122 in order for the antivirus record from the database of antivirus records 102 to be transferred to the database of antivirus records 122) is calculated on the basis of the lesser of the two coefficients of effectiveness being compared.

The information on the locations of the antivirus records which is used by the antivirus application 101 and the distribution module 125 for making a decision on the transfer of the antivirus records is obtained by the antivirus application 101 and the distribution module 125 from the database of statistics on the use of antivirus records 124.

In one exemplary aspect, the antivirus records which the antivirus application 101 should transfer (according to the above-described logic) from the database of antivirus records 102 to the database of antivirus records 122 are removed from the database of antivirus records 102. The database of antivirus records 122 residing on the remote server 120 may contain the full set of antivirus records which are being used by the antivirus application 101: the database of antivirus records 122 may additionally contain copies of the antivirus records being stored in the database 102, indicating that these antivirus records are copies. Thus, the transfer of the antivirus records from the database of antivirus records 102 to the database of antivirus records 122 may involve the removal of corresponding antivirus records from the database of antivirus records 102, and also the removal of the indication for the copies of the removed antivirus records that said antivirus records are copies, where the copies reside in the database of antivirus records 122. Consequently, when an antivirus record is moved by the distribution module 125 from the database of antivirus records 122 to the database of antivirus records 102 the distribution module 125 may create a copy of the antivirus record being moved in the database of antivirus records 122 indicating that the created antivirus record is a copy.

Figure 2:
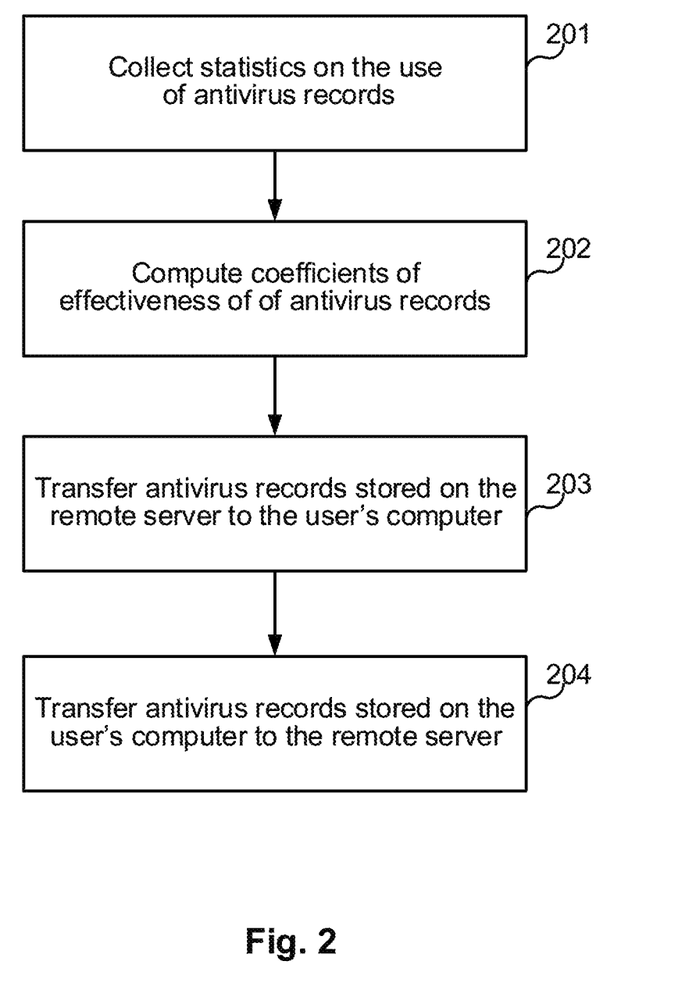
FIG. 2 shows a flow diagram of an exemplary method for distribution of antivirus records to user devices.

FIG. 2 shows a flow diagram of an exemplary method for distribution of antivirus records to user devices. In step 201, the antivirus application 101 collects statistics on the use of antivirus records which are being used for the detection of malicious files by the antivirus application 101 on the computer 100. The collected statistics are sent by the antivirus application 101 to the database of statistics on the use of antivirus records 124. The statistics on the use of antivirus records, which are stored on the remote server 120 in a database of statistics on the use of antivirus records 124, are used by the module for evaluating effectiveness 121 to compute the coefficients of effectiveness of the antivirus records, whose statistics of use are being stored in the database of statistics on the use of antivirus records 124. In step 202, the module for evaluating effectiveness 121 computes the coefficients of effectiveness of the antivirus records and transfers them to the antivirus application 101 and to the distribution module 125. Next, in step 203, the distribution module 125 transfers the antivirus records being stored on the remote server 120, specifically in the database of antivirus records 122, to the computer 100, specifically to the database of antivirus records 102. In one exemplary aspect, the distribution module 125 only transfers those antivirus records from the database 122 whose coefficients of effectiveness are among the largest coefficients of effectiveness of all antivirus records being used by the antivirus application 101. The number of the largest coefficients of effectiveness may be limited in this case by a threshold value. In step 204, the antivirus application 101 transfers the antivirus records being stored on the computer 100, specifically in the database of antivirus records 102, to the remote server 120, specifically to the database of antivirus records 122. In one exemplary aspect, the antivirus application 101 transfers only those antivirus records from the database 102 whose coefficients of effectiveness are not among the largest coefficients of effectiveness of all the antivirus records being used by the antivirus application 101. It should be noted that steps 203 and 204 can be performed both in different (reverse) order or at the same time.

Figure 3:
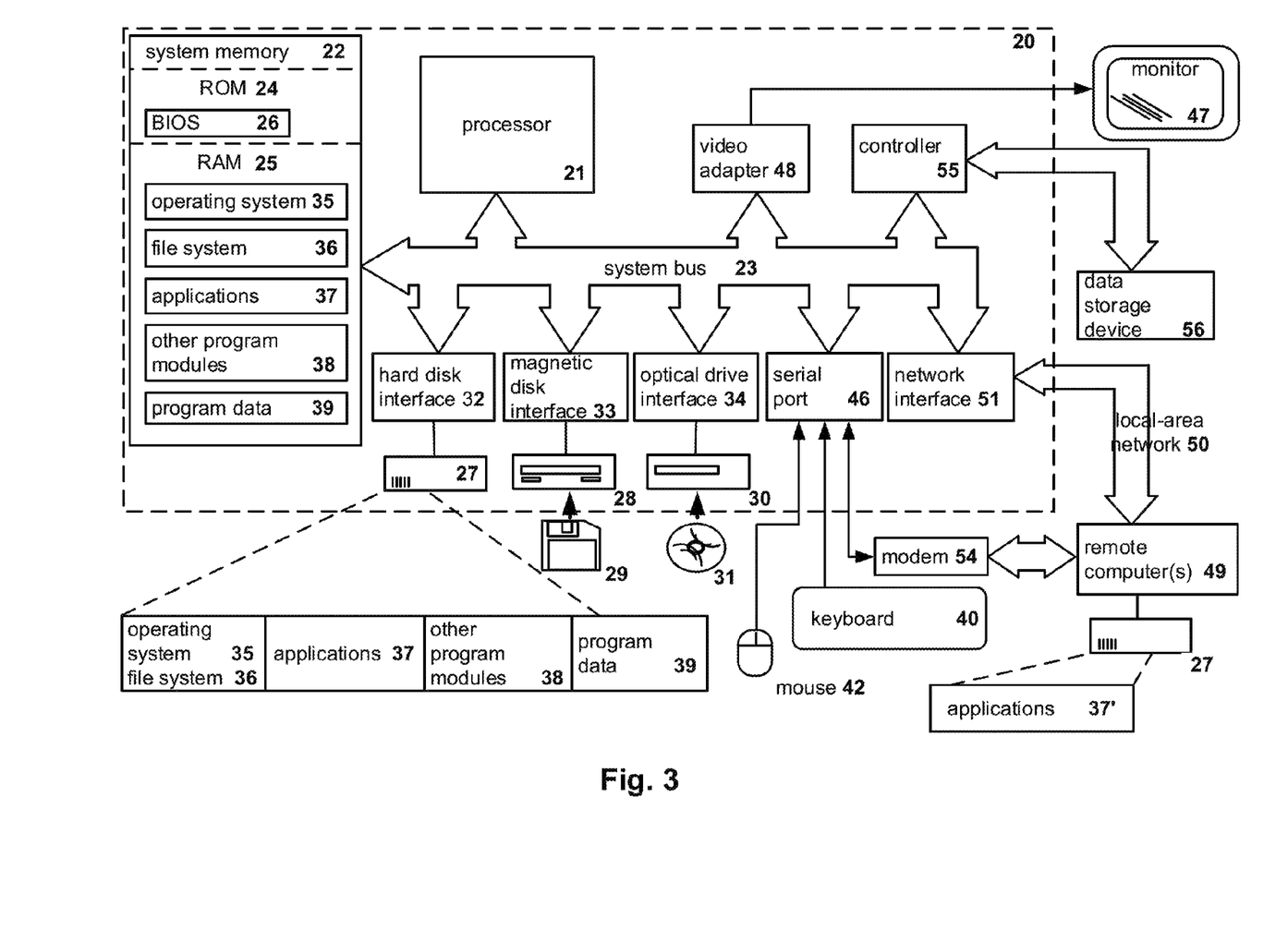
FIG. 3 illustrates an example of a general-purpose computer system by means of which the disclosed aspects of systems and method can be implemented.

FIG. 3 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are effectiveness-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modulers 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for distributing antivirus records to a user device, the method comprising:
   collecting, by a server, statistics on the use of a plurality of antivirus records deployed on a plurality of user devices;
   calculating, by the server, a coefficient of effectiveness of each antivirus record based on the collected statistics on the use of the plurality of antivirus records by the plurality of user devices, wherein the coefficient of effectiveness of an antivirus record is calculated as a function of a number of different malicious files detected using the antivirus record and an average time between detections of malicious files using said antivirus record;
   identifying, by the server, a group of the plurality of antivirus records having the largest coefficients of effectiveness, wherein the group is a number of the plurality of antivirus records not exceeding a threshold value; and
   transmitting, by the server, the group of antivirus records to at least one of the plurality of user devices for storage in an antivirus database for use by an antivirus application of the at least one user device.

2. The method of claim 1, further comprising:
   receiving, from the at least one user device, one or more less effective antivirus records removed from the antivirus database of the user device; and
   storing the one or more received less effective antivirus records in an antivirus database of the server if said antivirus records were not in the antivirus database of the server.

3. The method of claim 1, wherein an antivirus record of the plurality of antivirus records includes one or more of: a signature of a malicious file; a heuristic rule used for detection of a malicious file during emulation of the malicious file; a heuristic rule used for detection of a malicious file during proactive detection; and a locality sensitive hash of a malicious file.

4. The method of claim 1, wherein collecting statistics on the use of a plurality of antivirus records includes collecting information on a detection of a malicious file by the respective antivirus record.

5. The method of claim 1, further comprising calculating the coefficient of effectiveness of an antivirus record as a function of a number of unique user devices on which malicious files were detected using said antivirus record and a time between a moment of creation of said antivirus record and a moment of calculation of the coefficient of effectiveness of said antivirus record.

6. The method of claim 1, further comprising calculating the coefficient of effectiveness of the antivirus record further as a function of a number of unique user devices on which malicious files were detected using said antivirus record.

7. The method of claim 1, wherein transmitting the group of effective antivirus records to the least one user device includes transmitting the antivirus records in the group to the at least one user devices only when the effectiveness coefficient of each of the antivirus record exceeds the effectiveness coefficient of at least one less effective antivirus record on the at least one user device.

8. A system for distributing antivirus records to a user device, the system comprising:
   a server having a processor configured to:
   collect statistics on the use of a plurality of antivirus records deployed on a plurality of user devices;
   calculate a coefficient of effectiveness of each antivirus record based on the collected statistics on the use of the plurality of antivirus records, wherein the coefficient of effectiveness of an antivirus record is calculated as a function of a number of different malicious files detected using the antivirus record and an average time between detections of malicious files using said antivirus record;
   identify a group of the plurality of antivirus records having the largest coefficients of effectiveness, wherein the group is a number of the plurality of antivirus records not exceeding a threshold value; and
   transmit the group of antivirus records to at least one of the plurality of user devices for storage in an antivirus database for use by an antivirus application of the at least one user device.

9. The system of claim 8, wherein the processor is further configured to:
   receive, from the at least one user device, one or more less effective antivirus records removed from the antivirus database of the user device; and store the one or more received less effective antivirus records in an antivirus database of the server if said antivirus records were not in the antivirus database of the server.

10. The system of claim 8, wherein an antivirus record of the plurality of antivirus records includes one or more of: a signature of a malicious file; a heuristic rule used for detection of a malicious file during emulation of the malicious file; a heuristic rule used for detection of a malicious file during proactive detection; and a locality sensitive hash of a malicious file.

11. The system of claim 8, wherein the processor is further configured to collect statistics on the use of a plurality of antivirus records by collecting information on a detection of a malicious file by the respective antivirus record.

12. The system of claim 8, wherein the processor is further configured to calculate the coefficient of effectiveness of an antivirus record as a function of a number of unique user devices on which malicious files were detected using said antivirus record and a time between a moment of creation of said antivirus record and a moment of calculation of the coefficient of effectiveness of said antivirus record.

13. The system of claim 8, wherein the processor is further configured to calculate the coefficient of effectiveness of the antivirus record further as a function of a number of unique user devices on which malicious files were detected using said antivirus record.

14. The system of claim 8, wherein the processor is further configured to transmit the group of effective antivirus records to the least one user device by transmitting the antivirus records in the group to the at least one user devices only when the effectiveness coefficient of each of the antivirus record exceeds the effectiveness coefficient of at least one less effective antivirus record on the at least one user device.

15. A non-transitory computer readable medium storing computer executable instructions for distributing antivirus records to a user device, including instructions for:
collecting, by a server, statistics on the use of a plurality of antivirus records deployed on a plurality of user devices;
calculating, by the server, a coefficient of effectiveness of each antivirus record based on the collected statistics on the use of the plurality of antivirus records by the plurality of user devices, wherein the coefficient of effectiveness of an antivirus record is calculated as a function of a number of different malicious files detected using the antivirus record and an average time between detections of malicious files using said antivirus record;
identifying, by the server, a group of the plurality of antivirus records having the largest coefficients of effectiveness, wherein the group is a number of the plurality of antivirus records not exceeding a threshold value; and
transmitting, by the server, the group of antivirus records to at least one of the plurality of user devices for storage in an antivirus database for use by an antivirus application of the at least one user device.

16. The non-transitory computer readable medium of claim 15, further including instructions for:
receiving, from the at least one user device, one or more less effective antivirus records removed from the antivirus database of the user device; and
storing the one or more received less effective antivirus records in an antivirus database of the server if said antivirus records were not in the antivirus database of the server.

17. The non-transitory computer readable medium of claim 15, wherein an antivirus record of the plurality of antivirus records includes one or more of: a signature of a malicious file; a heuristic rule used for detection of a malicious file during emulation of the malicious file; a heuristic rule used for detection of a malicious file during proactive detection; and a locality sensitive hash of a malicious file.

18. The non-transitory computer readable medium of claim 15, further including instructions for collecting statistics on the use of the plurality of antivirus records by collecting information on a detection of a malicious file by the respective antivirus record.

19. The non-transitory computer readable medium of claim 15, further including instructions for calculating the coefficient of effectiveness of an antivirus record as a function of a number of unique user devices on which malicious files were detected using said antivirus record and a time between a moment of creation of said antivirus record and a moment of calculation of the coefficient of effectiveness of said antivirus record.

20. The non-transitory computer readable medium of claim 15, further including instructions for calculating the coefficient of effectiveness of the antivirus record further as a function of a number of unique user devices on which malicious files were detected using said antivirus record.

21. The non-transitory computer readable medium of claim 15, further including instructions for transmitting the group of effective antivirus records to the least one user devices by transmitting the antivirus records in the group to the at least one user device only when the effectiveness coefficient of each of the antivirus record exceeds the effectiveness coefficient of at least one less effective antivirus record on the at least one user device.

* * * * *